United States Patent [19]

Minin et al.

[11] 4,150,274

[45] Apr. 17, 1979

[54] METHOD FOR LAP WELDING OF TUBES AND DEVICE FOR EFFECTING SAME

[76] Inventors: Vladilen E. Minin, ulitsa Tereshkovoi, 36a, kv. 14; Mikhail S. Kachan, ulitsa Zolotodolinskaya, 17, kv. 7; Boris A. Yablochnikov, ulitsa Chaplygina, 39, kv. 4, all of Novosibirsk, U.S.S.R.

[21] Appl. No.: 630,150

[22] Filed: Nov. 10, 1975

[51] Int. Cl.² .............................................. B23K 19/00
[52] U.S. Cl. ..................................... 219/8.5; 219/59.1
[58] Field of Search ................ 219/7.5, 107, 149, 151, 219/152, 154, 8.5, 9.5, 101, 104, 59.1; 72/56

[56] References Cited

U.S. PATENT DOCUMENTS

| | | | |
|---|---|---|---|
| 3,258,573 | 6/1966 | Morin et al. | 219/7.5 X |
| 3,603,759 | 1/1970 | Peacock | 219/7.5 X |
| 3,794,805 | 2/1974 | Rudd | 219/7.5 X |

*Primary Examiner*—J. V. Truhe
*Assistant Examiner*—Clifford C. Shaw
*Attorney, Agent, or Firm*—Lackenbach, Lilling & Siegel

[57] ABSTRACT

A method is proposed for lap welding of tubes, comprising the steps of preheating the tubes by passing an electric current radially therebetween simultaneously along the entire circumference of the welded joint and subsequent compression of the welded surfaces of the tubes under the pressure of a pulsed magnetic field, the electric current being passed either as a pulse current or a train of such pulses and the tubes being arranged either with or without a gap therebetween.

Also proposed are devices for effecting this method.

The efficiency of the proposed method of welding and of the devices for effecting said method is 5-10 times more than that obtainable by the prior-art magnetic pulse welding procedures, both the method and devices being simple and economically efficient. Moreover, tubes of either similar or dissimilar metals can be welded by the proposed method.

7 Claims, 15 Drawing Figures

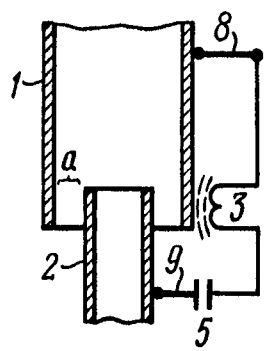
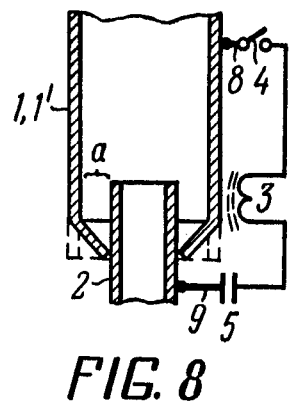
FIG.7　　　FIG.8
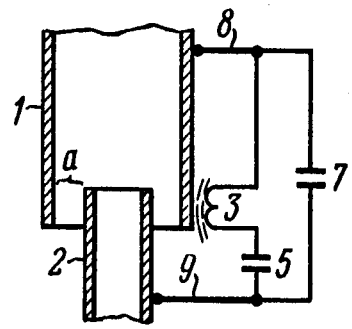
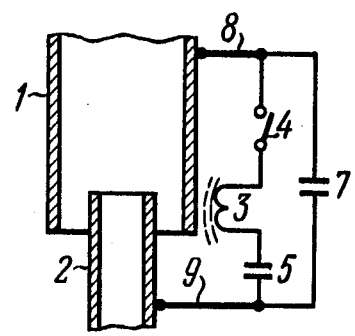
FIG.9　　　FIG.10
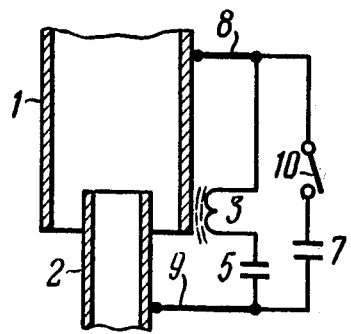
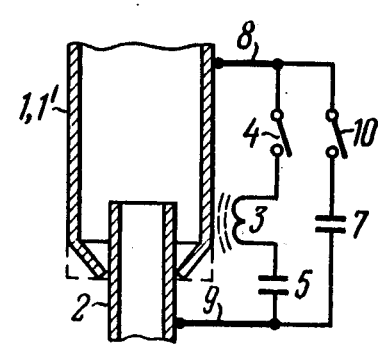
FIG.11　　　FIG.12

METHOD FOR LAP WELDING OF TUBES AND DEVICE FOR EFFECTING SAME

The present invention relates to methods of magnetic-pulse welding of metals and more particularly to methods for lap welding of tubes and to devices for effecting such methods.

It is known that magnetic-pulse welding makes it possible to join together tubes in similar and dissimilar metals with minimum power consumption. Such a procedure is employed mainly for welding thin-walled tubes in light metals and alloys. It is characterized by high outputs and high production efficiency. At present welding of tubes in aluminum alloys with wall thicknesses of 1–1.5 mm and a 30–40 mm diameter may be considered as a technologically mastered range. However, this range could have been extended substantially provided the efficiency of the welding process is higher, the service life of the outfits longer and preparatory operations simpler.

Known in the art is a method of magnetic-pulse welding (see, e.g., Inventor's Certificate of the USSR No. 226393, Cl. B23k 19/00), wherein a current is set up in an inductor when a bank of preliminary charged capacitors is connected thereto and induces a reverse current in a tube of an electrically conductive material, placed close to the inductor. The interaction of these currents whose magnetic fields feature a total pressure amplitude exceeding considerably the yield point of the metal being processed accelerates a welded section of a movable tube. Welding of tube skelps causes the radial transfer of the end section of the movable tube, a welded joint being produced when the above section collides with a stationary tube.

As a rule, a tube section deformed under the effect of a pulsed magnetic field has a shape of a thin-walled tube. A tube incorporating such a section will be referred to hereinafter as a movable tube and an undeformed tube as a stationary one. The latter may have a cylindrical, conical or some other outline. The above terms will be employed when considering simultaneously both tubes being welded together. If the tubes are preliminarily mounted with a gap therebetween, then the rate of a travelling section of the movable tube at the instant of their collision will attain a value of several hundreds of meters per second, the pressures developed in the contact zone of the surfaces being welded amounting to hundreds of thousand of atmospheres. If the surfaces collide at an angle (glancing collision), this being provided by profiling the tubes either preliminarily or during acceleration, a welded joint results.

The known method of magnetic-pulse welding suffers from the following disadvantages: low efficiency; a possibility of producing welds only at relatively high collision rates and a need of a thorough preweld cleaning of the surfaces being welded.

As for the efficiency of welding $\theta$, it is a ratio of the mass of metal being welded actually to the energy consumed, which may be expressed as:

$$\theta = 2\pi D l \delta \rho / C_o \cdot U_o 2)$$

where $d$ — average diameter of welded section of movable tube;
$l$ — weld width along the axis of movable tube;
$\delta$ — depth of welded section of movable tube;
$\rho$ — density of metal of movable tube;
$C_o$ — capacity of a bank of capacitors;
$U_o$ — voltage across the bank of capacitors.

The known devices for magnetic-pulse welding by the described method are characterized by a simple heavy-current circuit diagram. The latter comprises a bank of capacitors, a current switch gear and an inductor, all connected in series by low-inductance current leads.

The problems encountered in developing high-quality banks of capacitors have been to a great extent solved, since the industry has mastered the manufacture of impulse-discharge capacitors featuring a high specific storage capacity, low internal inductance and long service life. The current switch gears and especially the inductors are weak points of the devices for magnetic-pulse welding. A large part of energy delivered by the banks of capacitors is lost in the current switch gears. They are subject to wear and necessitate the use of trigger generators to control them. The working tool of the devices for magnetic-pulse welding is an inductor. Most widely known are multi- and single turn inductors, as well as multiturn inductor with a magnetic flux concentrator. The multiturn inductor has a practically uniform magnetic field, easily matches with a simple and inexpensive bank of capacitors but features a minimum mechanical strength. The single turn inductor has a maximum mechanical strength but necessitates the use of a high quality and, hence, expensive bank of capacitors. Moreover, it suffers from an inherent disadvantage - a weakened magnetic field in the gap zone. The above disadvantages are partially overcome in a multiturn inductor with a magnetic flux concentrator but at the expense of additional power losses. Thus, the problem of developing a perfect inductor is still to be solved. The magnetic-pulse welding technique calls for inductors capable of generating repetition magnetic field pulses with a maximum intensity, the problem of inductor durability being therefore especially crucial.

More perfect is a welding procedure (see, e.g., U.S. Pat. No. 3,258,573, Cl. 219–95), wherein prior to establishing a pulse magnetic field the tubes are heated until softening by high-frequency currents produced by a special generator. Such preheating allows the welding process to be conducted at smaller amplitudes of the pulse magnetic field, a feature extending the service life of inductors. However, the heating of the entire mass of tube metal leads to a high consumption of high-frequency currents, necessitates the use of inert gases to protect the surfaces being welded together against oxidation and changes in metal structure, finished articles being therefore subjected to postweld annealing.

The above-described welding procedure requires much more sophisticated devices than those employed for conventional magnetic-pulse welding. The cost of the high-frequency current generator approximates that of the magnetic-pulse system of the above device. The production rates of this process diminish materially owing to prolonged heating and annealing cycles, the welding process proper being rendered much more expensive.

Thus, the known method does not solve the problems encountered in magnetic-pulse welding.

The main object of the invention is to overcome the above disadvantages of the lap welding methods adopted in world practice.

Another object of the invention is to provide a method for lap welding of tubes and a device for effecting said method which would ensure a higher efficiency in welding tubes in similar and dissimilar metals, high quality and identity of welded joints by changing the mode of electric-current heating of said tubes.

Said and other objects are achieved by the provision of a method for lap welding of tubes of which one is a movable tube having a tubular welded section and the other is a stationary tube with a welded section coaxial with the movable tube, said method comprising the steps of preheating said tubes and subsequent compression of their surfaces being welded by deforming the welded section of the movable tube under the pressure of a pulse magnetic field, wherein, according to the invention, preheating is effected by passing an electric current in radial directions betwen the tubes simultaneously along the entire circumference of a welded joint.

It is expedient that the electric current passed between the tubes be a pulse current or a train of such pulses.

The pulsed current can be passed between the tubes at the instant their welded surfaces are being compressed.

The tubes can be arranged with a gap filled by an electrically conductive material.

The welded section of the movable tube should be better imparted a shape of a truncated cone, its end touching the stationary tube along its circumference.

It is especially favourable if the tubes be disposed with the gap filled with a low-pressure gas.

The tubes can be manufactured from similar metals, such as, steel-steel, copper-copper and aluminium-aluminium.

But they can be also produced from dissimilar metals, such as, copper-steel, steel-aluminium and alloys thereof, steel-titanium and alloys thereof, copper-titanium and alloys thereof, aluminium-titanium and alloys thereof.

To carry the proposed method into effect in a device, comprising a bank of capacitors series-connected with a current switch gear and with an inductor adapted to deform the welded section of the movable tube, according to the invention, an activation bank of capacitors is coupled to the tubes by low-inductance current leads to provide the generation of the pulse current therebetween.

It is quite reasonable if a current switch gear be connected in series to the circuit of the activation bank of capacitors, said current switch gear allowing the tube to be welded at a low break-down voltage through the gap therebetween, both when the gap is filled with an electrically conductive material and when the tubes are in direct contact with each other.

It is most efficient if a high-voltage winding of a pulse matching transformer be inserted into the circuit of the activation bank of capacitors, its low-voltage winding being connected to the tubes.

According to the invention, in the device, comprising the bank of capacitors connected in series to the inductor deforming the welded section of the movable tube, a possibility to provided to couple one tube to the inductor and the other one to the bank of capacitors by making use of low-inductance current leads. With the above arrangement the current switch gear can be obviated since the tubes proper will act as a current switch gear, the tubes being heated by the pulse current passing through the inductor.

The current switch gear can be series-connected with the inductor, bank of capacitors and tubes; this would make it possible to weld the tubes at a low breakdown voltage both with the gap filled by an electrically conductive-material and with the tubes touching each other.

It would be of value if the device comprising the bank of capacitors series-connected with the tubes and with the inductor deforming the welded section of the movable tube an activation bank of capacitors be connected to the tubes to increase the pulse electric current passing therebetween.

It is advisable that the current switch gear allowing the operating voltage of the bank of capacitors to be increased be series-connected with the inductor and with the bank of capacitors.

It is also expedient if the current switch gear be connected in series to the activation bank of capacitors providing therefore a high operating voltage in the bank and a possibility of cutting it in, e.g., at the instant the surfaces to be welded are compressed, rather than be series-connected to the bank of capacitors and the inductor and thus preserve small losses in this circuit.

It is particularly of value if one current switch gear be series-connected with the inductor and the bank of capacitors and another one with the activation bank of capacitors providing thereby an ample possibility of adjusting welding conditions.

The device, comprising the bank of capacitors series-connected by low-inductance current leads with the tubes being welded and with the inductor deforming the welded section of the movable tube, would better have a gap between one of the tubes and their low-inductance current lead, said gap being filled with a low-pressure gas and broken-down by an electric discharge during welding.

The tubes and their low-inductance current leads can be set up with a gap filled with the low-pressure gas and broken-down by electric discharges while welding.

It is also expedient that in the device, comprising the bank of capacitors, series-connected with the current switch gear and with the inductor deforming the welded section of the movable tube, and the activation bank of capacitors coupled by the low-inductance current leads to the tubes to produce a pulse current therebetween a gap, filled with the low-pressure gas and broken-down by an electric discharge while welding, be provided between one of the tubes and its low inductance current lead.

It is also sound practice that both tubes and their low-inductance current leads be arranged with gaps filled with a low-pressure gas and broken-down by electric discharges while welding.

Finally, it is profitable that the terminals of the bank of capacitors be provided with disconnectors.

The efficiency of the proposed welding method is 5-10 times more than that of the prior-art magnetic-pulse welding procedures. The proposed method requires neither labour-consuming and expensive operations nor cleaning of the surfaces being welded. It provides an extensive possibility of lap welding tubes with different structure in the welding zone, such as, welding through an interlayer of a metal powder or a solder (soldering) welding similar to the prior-art capacitor discharge process. Most promising from the practical standpoint is welding of tubes mounted with a gap, that is filled with a low-pressure gas, and heated by a pulsed current of high magnitude of the order of $10^3$–$10^7$ A. The gap allows accelerating the welded section of the movable tube to a speed of several hundreds of meters per second and developing high pressures between the welded surfaces during its collision with the stationary skelp. In this case the current will flow through an electric discharge in the gas filling the gap. Owing to a pulse nature of the current it is possible to obtain a powerful pulse with the aid of simple and inexpensive energy storing devices of which the most convenient is a bank of capacitors. High-power thermal flux to which the welded surfaces of the tubes are exposed during the passage of a heavy pulse current and a restricted heat conductivity of metals result in only thin surface layers of the tubes being heated to a melting point.

A significant factor conducive to the production of a welded joint is the pressure of a natural magnetic field established by the current and proportional to the square of current density. The large amplitude of the pulse current flowing between the tubes corresponds to a high pressure of its natural magnetic field on the electric discharge in the gap between the tubes. This pressure forces the burning-out products of impurities and oxides with a large speed away from the gap and drives some molten metal off the welded surfaces.

Thus, in the proposed version the tubes are not only preheated prior to welding but a far more efficient sequence of preparatory processes is effected, the above sequence comprising the steps of preheating only thin metal layers of the welded surfaces to their melting points and of cleaning these surfaces under the effect of the pressure of the natural pulse current magnetic field. The joint effect of these two processes would be referred to hereinafter as "tube activation" or "activation of the welded surfaces".

An effective electrothermal activation of the welded surfaces under the effect of a powerful electric discharge between the tubes just before or in the course of their collision guarantees high-quality and identity of the welded joints. It allows obtaining high-quality welded joints at much lower collision rates of the welded surfaces (100–200 m/s) than in case of conventional magnetic-pulse welding.

As a result, the magnetic field intensity in the inductor can be descreased and, hence, the problem of its longevity would be solved in a most efficient way.

Owing to an impulse transitory nature of activation of only thin surface layers of the tubes according to the invention the whole mass of metal remains practically cold which preserves its structure and creates the necessary conditions for the formation of qualitatively novel kinds of structure in welded joints. This offers a possibility of welding various metal pairs which either cannot be welded by the prior-art welding procedures or are welded at the expense of efficiency.

The welded joints produced by the proposed method have practically always a high vacuum-tightness.

The devices for effecting the proposed welding method are advisable to replace standard outfits for magnetic-pulse welding, especially when their potentialities are exhausted; in practice it means that they can be employed for welding tubes in light metals and alloys with a diameter of a welded section of the movable skelp exceeding 30 mm and wall thicknesses over 1 mm. For a movable tube in heavy metals and alloys the above-specified dimensions would be accordingly about 20 mm and 0.5 mm. The proposed method of welding is always preferable when a vacuum-tight welded joint is required.

The nature of the invention will be clear from the following detailed description of its particular embodiments to be had in conjunction with the accompanying drawings, in which:

FIG. 7 shows a device for effecting the proposed method of welding, according to the invention, with the tubes series-connected with an inductor and a bank of capacitors;

FIG. 8 shows a device for effecting the proposed method of welding according to the invention, comprising a current switch gear series-connected with an inductor, a bank of capacitors and with the tubes;

FIG. 9 illustrates a device for effecting the proposed method of welding, according to the invention comprising an activation bank of capacitors connected to the tubes in parallel with an electric circuit, comprising a series connected inductor and a bank of capacitors;

FIG. 10 shows a device for carrying out the proposed method of welding into practice, comprising, according to the invention, an activation bank of capacitors connected to the tubes in parallel with an electric circuit, comprising an inductor, a bank of capacitors and a current switch gear connected in series;

FIG. 11 depicts a device for realizing the proposed method of welding, according to the invention, with an activation bank of capacitors connected through a current switch gear to the tubes in parallel with an electric circuit, comprising an inductor and a bank of capacitors connected in series;

FIG. 12 shows a device for effecting the proposed method of welding according to the invention, with an activation bank of capacitors connected through a current switch gear to the tubes in parallel with an electric circuit, comprising an inductor, a bank of capacitors and a current switch gear connected in series;

Figure 14:
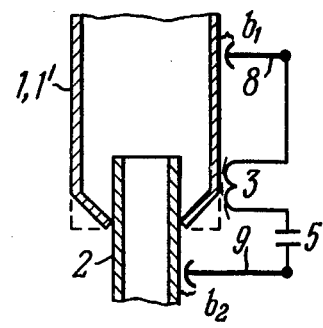
Figure 15:
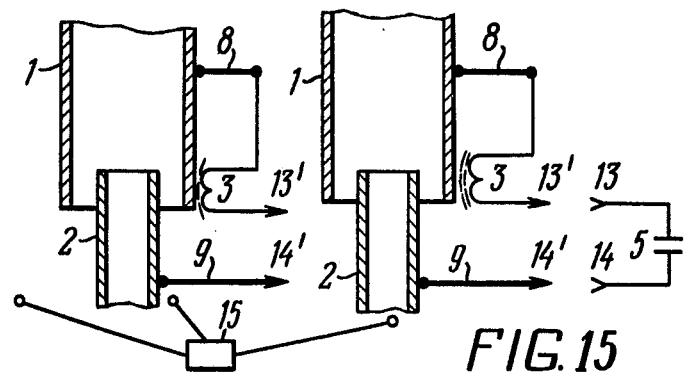

FIG. 14 shows a device for realizing the proposed method of welding according to the invention, with gaps provided between both tubes and their low-inductance current leads connecting them to an electric circuit, comprising an inductor and a bank of capacitors connected in series, and FIG. 15 shows a device for effecting the proposed method of welding according to the invention wherein there is provided a disconnector between an bank of capacitors and an electric circuit, comprising the tubes, an inductor and low-inductance current leads connected in series.

As is known, to produce a welded joint metal surfaces must be drawn together at a distance ensuring the interaction of interatomic forces. This may be accomplished either by heating the metal until a common welding pool is established (fusion welding) or by applying a pressure sufficient for plastic flow of metals (pressure welding). In the latter case the surfaces being welded must be thoroughly cleaned from oxide and grease films and from a layer of absorbed gases filling free valence bonds of the surface metal atoms.

In different particular embodiments of the proposed method of welding the degree of heating, cleaning and compression of the welded surfaces can vary within a broad range. But the heating of tubes by passing an electric current simultaneously in radial directions between the tubes along the entire circumference of the welded joint is common for all these embodiments.

To this end, if welding is carried out by axial deformation normal to the axes of the welded section of the movable tube, the section is placed into an inductor. In case the welding process is conducted by deforming the tube in the opposite direction, the inductor is introduced into the movable tube. Tubes of various shapes may be taken for welding use. But a prerequisite of the proposed welding procedure is a tubular shape of the welded section of the movable tube. In most cases of practical importance it has an outline of a cylindrical tube, although a conical tube or that with an elliptical, square or some other cross-secton will do as well. A stationary tube may be either tubular or solid, e.g., being shaped as a cylinder, cone, a drum head, a plug, etc. In most cases its section by a plane normal to the axis is similar in its configuration to that of the movable tube, but it may differ from the latter.

Figure 1:
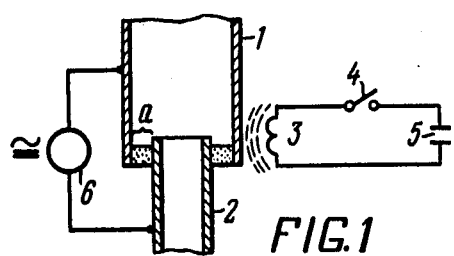
FIG. 1 is a schematic drawing illustrating the proposed method for welding tubes according to the invention, when they are arranged with a gap filled with an electrically conductive material.

In the drawings, FIG. 1 illustrates diagrammatically the welding procedure when a movable tube 1 is placed with a gap "a" with respect to a stationary tube 2. The gap "a" is filled with some electrically conductive material, such as, a metal powder weldable with both metals, that of the tube 1 and of the tube 2. The welded section of the movable tube 1 is contained within an inductor 3 and is deformed radially to the axes of the tubes 1 and 2. Series-connected with the inductor 3 through a current switch gear 4 is a bank of capacitors 5. Coupled to the tubes 1 and 2 is an electric current generator 6. Before the beginning of the welding cycle the tubes 1 and 2 are mounted as required, the gap "a" therebetween is filled with a proper material and the bank of capacitors 5 is charged to the operating voltage.

The welding cycle is initiated by supplying electric current to the tubes 1 and 2 from the current generator 6. The gap "a" between the tubes 1 and 2 is filled with an electrically conductive material in the form of a metal powder which is much superior in its resistance to the rest of the elements of the given electric circuit. Therefore the passage of electric current through this gap results in heat liberation.

The amount of liberated heat varies depending on the rating of the current generator 6 and the time of current flow, the degree of heating of the metal powder and of the welded sections of the tubes 1 and 2 therefore, being different. In each particular case its optimum value should be selected experimentally by several weld tests.

Upon heating the tubes 1 and 2 and the electrically conductive material the current switch gear 4 is inserted therebetween or closed. As a result, the bank of capacitors 5 discharges through the inductor 3, setting up a pulsed magnetic field therein. Under the effect of this field, the welded section of the tubes 1 is deformed, this resulting in the compression of the heated electrically conductive material between the hot surfaces of the tubes 1 and 2 and in the subsequent welding of these tubes 1 and 2. In this case a welded joint between the tubes 1 and 2 has an interlayer of the electrically conductive material.

It is expedient that the electric current be passed between the tubes 1 and 2 in the form of a pulse current or a train of such pulses. In this case powerful current pulses of short duration and, hence, heat flux pulses in the welding zone can be obtained by using simple engineering means. Practically, heat diffusion from the welding zone is always negligibly small, this enhancing the efficiency of electric-current heating of the tubes 1 and 2. Owing to a transitory nature of the heating of the welding zone, it does not lead to oxidation of the welded surfaces.

In most cases the energy needed for producing the pulse current can be preliminarily stored in energy storing devices of which the banks of capacitors have found most wide application. Owing to this energy stored within a time period exceeding by hundreds of thousand of times the duration of the heating cycle, only a very small amount of energy is drawn from the supply main.

The impulse nature of the heating current makes it possible to realize in practice an important embodiment of the proposed method, wherein an electric current is passed between the tubes 1 and 2 at the instant their welded surfaces are compressed. This affords the possibility of, for example, prepressing the powdery electrically conductive material in the gap "a" between the tubes 1 and 2 stabilizing its electrical characteristics and enhancing thereby the efficiency of electric-current heating.

Figure 2:
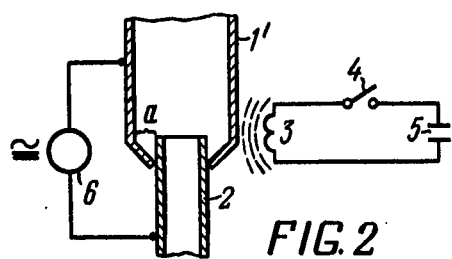
FIG. 2 is a schematic drawing illustrating the proposed method of welding tubes, according to the invention, when the welded section of a movable tube is shaped as a truncated cone and when its end touches a stationary tube along its circumference.

FIG. 2 shows diagrammatically a particular embodiment of the proposed method of welding without an interlayer of an electrically conductive material. To this end, the welded section of a tube 1' is shaped as a truncated cone with its end touching the stationary tube 2 along the circumference. The tube 1' can be shaped either outside the welding outfit so as to be inserted therein, the latter being more convenient as the shaping process can be accomplished under the effect of a magnetic field established in the inductor 3 prior to welding, the inductor accommodating the welded section of the tube 1'.

According to FIG. 2, the current generator 6 is connected to the tubes 1' and 2 inserted into the inductor 3 fed through the current switch gear 4 from the bank of capacitors 5. Before the welding cycle is initiated the tubes 1' and 2 are set up in the above-described manner and the bank of capacitors 5 is charged to the operating voltage.

The welding cycle commences by supplying electric current to the tubes 1' and 2 from the current generator 6. At the point of contact of the tubes 1' and 2 the active resistance of the electric circuit is much larger than in its remaining sections. Therefore, the passage of electric current results in the abstraction of large amounts of heat at this point. Depending on the rating of the current generator 6 and on the time of current flow there can be two groups of heating conditions for the tubes heated in the welding zone, the first one being characterized by the amount of heat released at the point of contact of the tube 1' and 2, said amount being sufficient only for melting small quantities of metal on both tubes 1' and 2. In this case the welding process similar in the nature of the welded joint to the known capacitor discharge procedure is effected upon cutting-in the current switch gear 4 enabling the bank of capacitors 5 to discharge through the inductor 3 and establishing thereby a pulse magnetic field therein.

The second group of condition usually takes place when using heavy pulse currents and is characterized by the amount of heat released at the point of contact of the tubes 1' and 2, said amount being sufficient for melting large quantities of metal on the surfaces of the tubes 1' and 2 and for their partial evaporation. In this case the heating process is accompanied by a high pressure exerted by the natural magnetic field of the pulsed electric current in the zone of heating of the tubes 1' and 2. The combined effect of the above-described phenomena results in the removal of molten metals from the zone of initial contact of the tubes 1' and 2 and in subsequent flow of the current through an electric discharge between the tubes 1' and 2 in metal vapours. Thus, the process of heating of the tubes 1' and 2 passes over to its second stage referred to earlier as the tube activation.

It is known that electric discharges at a heavy current are unstable. They have a tendency towards pinching into one or several channels (pinch-effect). Similar phenomena occur when heating the tubes 1' and 2 by the proposed method. But since in this particular case only the final result of the current flow is of practical interest, i.e. the heating of the tubes 1' and 2, the degree of stability of an electric discharge is not decisive. As shown by experiments, the surfaces of the tubes 1' and 2 activated by an electric discharge are covered by numerous traces of more-pronounced metal erosion at the points of current concentrations against a background of sufficiently uniformly-fused surfaces. The activated surface is uniform along the circumference of the welded joint. Its width varies within 5–30 mm depending on the magnitude of the pulse current and tubes geometry.

A welded joint is produced when the welded section of the movable tube 1' is compressed by the pulsed magnetic field set up in the inductor 3 by connecting to it the bank of capacitors 5 with the help of the current switch gear 4.

Its structure, if traced axially from the point of initial contact of the tubes 1' and 2, changes along its width. First the structure of the welded joint is similar to that obtained by the known capacitor discharge welding process but then it acquires a specific appearance characterized by waves on the welded surfaces of the tubes 1' and 2 sandwiched with an interlayer of frozen molten metal.

Figure 3:
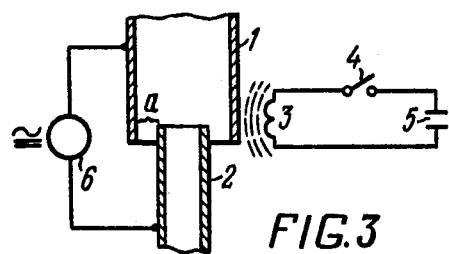
FIG. 3 is a schematic drawing illustrating the proposed method of welding of tubes, when they are placed with a gap filled with a low-pressure gas.

FIG. 3 illustrates diagrammatically a proposed method of welding, a tube 1 being placed with respect to a stationary tube 2, wherein a gap "a" filled with a gas at a low pressure of about $10^{-1} - 10^{-6}$ mm Hg. The welded section of the movable tube 1 is arranged inside an inductor 3. This section is deformed radially to the axes of the tubes 1 and 2. A bank of capacitors 5 is series-connected with the inductor 3 through a current switch gear 4. Coupled to the tubes 1 and 2 is an electric current generator 6.

Before the welding cycle is initiated the tubes 1 and 2 are properly mounted, the gap "a" therebetween is filled with the gas at a low pressure of about $10^{-1} - 10^{-6}$ mm Hg and the bank of capacitors 5 is charged to its operating voltage.

The welded cycle commences by applying voltage to the tubes 1 and 2 and initiating an electric discharge in the gap "a". An electric discharge in a low-pressure gas, though requiring certain engineering measures to provide it for, has a number of definite advantages in comparison with the discharges of other kinds.

It is rather noiseless and its gasdynamic effect on the tubes 1 and 2 as well as on the units of a welding machine is small. The gasdynamic effect depends on residual gas pressure in the gap "a". The electric discharge in the low-pressure gas is more stable and the discharge voltage for the gaps "a" allowable from a technological point of view is higher. The latter depends on the tube configuration and residual pressure in the gap "a". An additional advantage of the electric discharge at a low pressure lies in that it can be initiated by changing the pressure in accordance with the known "Paschen law".

The use of a pulse currrent provides for a most favourable activation of the welded tube surfaces. Investigations of the activate surface of the tubes 1 and 2 have shown that in contrast to the preceding embodiment it is completely free from any heterogeneities, the property remaining even in case of considerable misalignment of the tubes 1 and 2. The degree of activation of the tubes 1 and 2 depends on the rating of the current generator 6 and on the current-on period. Its optimum value must be selected experimentally in each particular case by several weld tests.

Upon activating the tubes 1 and 2 the current switch gear 4 is cut in or closed and the welded section of the tube 1 is compressed under the effect of the pulsed magnetic field established in the inductor 3 when the bank of capacitors 5 discharges thereinto. Travelling over a distance equal to the value of the gap "a", each element of the welded section of the movable tube 1 attains a speed of hundreds of meters per second and upon colliding with the stationary tube 2 develops high pressures between the welded surfaces of the tubes 1 and 2. It should be noted that, owing to the activation of these surfaces, substantially lower rates of travel of the welded section of the movable tube 1 can be used than those employed in the prior-art magnetic-pulse welding.

The welded surfaces of the tubes 1 and 2 must collide at a certain angle of about 6°. In terms of technology, it is most expedient to provide the above angle in the course of acceleration of the welded section of the movable tube 1 by providing a corresponding outline of the magnetic field along the axes of the tubes 1 and 2. Preliminary profiling of the tubes 1,2 separately or simultaneously is also admissible.

A weld is the result of collision of the welded surfaces of the tubes 1 and 2, the proposed method of welding differs from the prior-art ones in the resulting weld structure. Peculiar to it is the presence of waves on the welded surfaces of the tubes 1 and 2, said waves being sandwiched with an interlayer of frozen molten metals. The amount of solidified melts as well as the amplitude and frequency of the waves can vary along the weld width and depending on welding conditions. The above procedure allows the production of welds of particularly high quality, their vacuum-tightness being guaranteed in a wide range of welding conditions.

Figure 4:
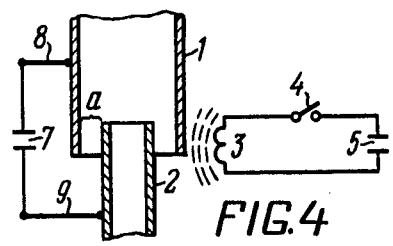
FIG. 4 shows a device for effecting the proposed method of welding, according to the invention, by connecting an activation bank of capacitors to the tubes.

Presented in FIG. 4 is a schematic drawing of a device for effecting a proposed method of welding. Apart from tubes 1 and 2 being welded it comprises an inductor 3 connected through a current switch gear 4 to a bank of capacitors 5. The inductor 3 accommodates the welded section of the movable tube 1. Coupled to the tubes 1 and 2 by means of low-inductance current leads 8 and 9 is an activation bank of capacitors 7. The tubes 1 and 2 are arranged with a gap "a" filled with a low-pressure gas. Since the power supply and control circuits of the banks of capacitors 5 and 7 are of the conventional type usually employed with the above outfits, they will not be discussed here.

In the device under consideration the gap "a" between the tubes 1 and 2 is used not only for accelerating the welded section of the tube 1 but for switching the discharge current of the activation bank of capacitors 7. The break-down voltage of the gap "a" should somewhat exceed the operating voltage of the activation bank of capacitors. The selection of the operating voltage is dictated by a need to provide the intensity and duration of the pulse current to suit the requisite degree of activation of the tubes. From the point of view of technology in most cases the gap "a" cannot exceed 1–3 mm. Therefore its break-down voltage may prove to be lower than the requisite operating voltage of the activation bank of capacitors 7 even at very low gas pressures. Subsequently the term "high break-down voltage of the gap "a" between the tubes" will be resorted to in case it exceeds the operating voltage across the bank of capacitors 7 whose current is switched by the electric discharge in the gap "a". Accordingly the term "low break-down voltage of the gap "a" between the tubes" will be used when this voltage is lower than the operating voltage across the bank of capacitors whose current is switched by an electric discharge in the gap "a".

The schematic diagram under consideration relates to the case of a high break-down voltage of the gap "a". The switching of the current of the activation bank of capacitors 7 by an electric discharge in the gap "a" has the following advantages: active energy losses are minimized; the current switch gear and its control apparatus are obviated; the possibility of switching the discharge of the activation bank of capacitors 7 any required number of times, since switching function is performed by each pair of newly mounted tubes 1 and 2. Before the beginning of the welding cycle the tubes 1 and 2 are set up as required, the gap "a" is filled with a low-pressure gas the banks of capacitors 5 and 7 are charged to the operating voltage. The gas contained in the gap "a" may have a different pressure depending on the particular kind of tubes, the capacity of an evacuation system, the quality of vacuum sealing of the tubes and on the specific features of the gas being employed. In practice it is always more expedient to work at P.a lying on the left-hand branch of the known Paschen curve, where P is the residual gas pressure in the gap "a".

The above-described device functions as follows: an electric discharge is initiated in the gap "a" by using any known procedure, e.g., by means of a trigger spark produced close to the gap "a". The discharge current of the activation bank of capacitors 7 in the form of a dying sinusoid flows through the electric discharge in the gap "a" and activates the welded surfaces of the tubes 1 and 2. The storage capacity of the bank of capacitors 7 and its operating voltage are selected to ensure the requisite activation effect by several weld tests.

Upon activating the tubes 1 and 2 the current switch gear 4 is cut in or closed and the bank of capacitors 5 discharges into the inductor 3 establishing a pulsed magnetic field therein. Under the pressure of this magnetic field the welded section of the tube 1 is deformed and accelerated at a distance equal to the gap "a" to attain a speed of several hundreds of meters per second. As the welded sections of the tubes 1 and 2 collide, a welded joint is produced and the welding cycle is completed.

It should be noted that the switching of the discharge current of the activation bank of capacities 7 by the electric discharge in the gap "a" and the use of the tubes 1 and 2 in the function of a current switch gear is very convenient as regards the design of the low-inductance current leads 8 and 9. Evidently, low inductance of the discharge circuit of the activation bank of capacitors 7 ensures a higher current amplitude and, hence, causes a maximum activation effect.

Figure 5:
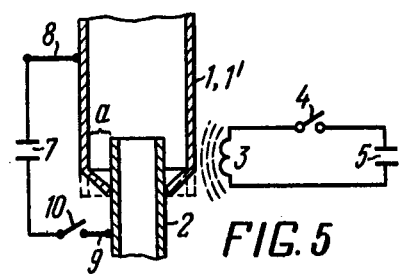
FIG. 5 shows a device for effecting the proposed method of welding according to the invention, comprising a current switch gear inserted into the circuit of an activation bank of capacitors.

FIG. 5 shows a schematic diagram of a device for effecting a proposed method of welding at a low breakdown voltage of the gap "a", the gap being filled with an electrically conductive material and tubes 1' and 2 touching each other. The device ensuring the welding together of the movable tube 1 (or 1') and the stationary tube 2 comprises an inductor 3 connected through the current switch gear 4 to a bank of capacitors 5. An activation bank of capacitors 7 is coupled to the tubes 1(1') and 2 through a series connected current switch gear 10 by means of low-inductance current leads 8 and 9. In the above device the operating voltage of the activation bank of capacitors 7 is lower than the break-down voltage of the current switch gear 10. The latter can reach very high values while the break-down voltage of the gap "a" can be small or the gap can be broken-down by the above-described methods.

The above device provides ample possibility of adjusting welding conditions.

Prior to the beginning of the welding cycle the tubes 1(1') and 2 should be mounted properly. If the tubes 1 and 2 are spaced forming the gap "a", the latter is filled with an electrically conductive material or a low-pressure gas. The banks of capacitors 5 and 7 should be charged to the operating voltage.

As for the on-time of the current switch gears 4 and 10, it may differ widely. The on-time as well as the operating voltages across the banks of capacitors 5 and 7 are selected experimentally in each particular case by weld tests. All the welding conditions can be subdivided into two groups: first, when the current switch gear 10, inserted into the circuit of the activation bank of capacitors 7, is cut-in or closed the first, and the second group, when the current switch gear 4 in the circuit of the bank of capacitors 5 is first to be cut-in or closed establishing a magnetic field in the inductor 3. Naturally, there may be cases when the current switch gears 4 and 10 are cut-in or closed simultaneously, Welding conditions of the first group begin by cutting-in or closing the current switch gear 10, the bank of capacitors 7 discharging as a result between the tubes 1(1') and 2 causing the heating or activation of the welded surfaces in that place. The current switch gear 4 is energized after an optimum period of time selected experimentally, and the bank of capacitors 5 starts discharging through the inductor 3 establishing a pulsed magnetic field therein. Under the pressure of this field the welded section of the tube 1 (1') is deformed until the welded surfaces of the tubes 1(1') and 2 are compressed directly or through an interlayer of an electrically conductive material.

If the gap "a" is filled with the low-pressure gas said surfaces collide, and a weld is produced under the conditions of the first group.

The welding cycle according to the second group of conditions commences by cutting-in or closing the current switch gear 4. As a result the bank of capacitors 5 discharges to the inductor 3 setting up a pulse magnetic field therein. Under the pressure of this field the welded section of the tube 1(1') is deformed changing the break-down voltage of the gap "a", characteristics of the electrically conductive material filling the gap or an active resistance of the junction between the tubes 1' and 2. Next the current switch gear 10 is energized at an optimum instant selected experimentally by weld tests and the activation bank of capacitors 7 discharges through the medium between the tubes 1(1') and 2 heating or activating the welding zone. During further travel of the welded section of the tube 1(1') the welded surfaces of the tubes 1(1') and 2 are either compressed or collide and a weld is produced.

Simultaneous cutting-in or closing of the current switch gears 4 amd 10 can be considered as a particular case only formally, since the heating or activation would always occur slightly earlier, insofar as the welded section of the tube 1(1') must travel over some distance to provide the compression or collision effect on the welded surfaces.

Figure 6:
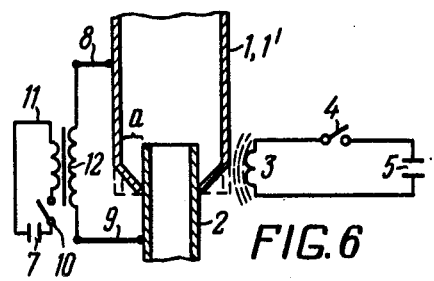
FIG. 6 depicts a device for effecting the proposed method of welding, according to the invention, comprising a matching transformer being in the circuit of an activation bank of capacitors.

Illustrated in FIG. 6 is a schematic diagram of a device for realizing a proposed method of welding at a low break-down voltage of the gap "a" in case the gap is filled wth an electrically conductive material and when tubes 1' and 2 contact each other. A specific feature of this device consists in the use of a pulse matching transformer for enhancing the efficiency of heating or activation of the welded surfaces of the tubes 1 (1') and 2.

The above device ensures welding together of the tubes 1(1') and 2. It comprises an inductor 3 coupled through a current switch gear 4 to a bank of capacitors 5. The inductor 3 accommodates the welded section of the movable tube 1 or (1'). A low-voltage winding 12 of the pulse matching transformer is connected to the tubes 1(1') and 2 by means of low-inductance current leads 8 and 9, a high-voltage winding 11 of the transformer being coupled through a current switch gear 10 to an activation bank of capacitors 7.

Before the welding cycle is initiated the tubes 1(1') and 2 should be placed properly. If a gap "a" is provided between the tubes, it is filled with an electrically conductive material or a low-pressure gas. The banks of capacitors 5 and 7 must be charged to the operating voltage.

Welding conditions provided by the above device can be also classed into two groups. The welding process of the first group starts by cutting-in or closing a current switch gear 10, the activation bank of capacitors 7 discharging as a result to the high-voltage winding 11 of the pulse matching transformer. The originating magnetic flux permeates the low-voltage transformer winding 12 and the ensuing voltage induced at its terminals is applied to the tubes 1(1') and 2. As a result an electric current starts flowing therebetween. If the gap "a" is filled with the low-pressure gas, the break-down voltage of the gap must be smaller than that induced at the terminals of the low-voltage winding 12 of the pulse matching transformer. The electric current heats or activates the welded surfaces of the tubes 1(1') and 2.

Owing to the use of a pulse transformer the low active resistance of the gap "a" between the tubes 1(1') and 2 can be matched with the circuit parameters of the activation bank of capacitors 7. Optimum matching conditions corresponding to a maximum power released in the active resistance of the gap "a" will be obtained when $R = 2\sqrt{L/C}$, where $R$ — resistance of gap "a" reduced to the primary winding of the pulse matching transformer, $L$ — circuit inductance, $C$ — capacity of bank of capacitors 7. Matching enables a considerable portion of energy stored in the activation bank of capacitors 7 to be transmitted to the welded surfaces of the tube 1(1') and 2.

Upon heating (activation) of these surfaces after an optimum period of time selected experimentally the current switch gear 4 is cut-in or closed and the bank of capacitors 5 commences to discharge through the inductor 3 establishing a pulsed magnetic field therein. Under the pressure of this field the welded section of the tube 1(1') is deformed until the welded surfaces of the tubes 1(1') and 2 are compressed directly or through the intermediate electrically conductive material. In case the gap "a" is filled with a low-pressure gas, a collision of the welded surfaces occurs resulting in welding suitable for the first group of welding conditions.

The welding cycle for the second group of welding conditions is initiated upon cutting-in or closing the current switch gear 4 and an ensuing discharge of the bank of capacitors 5 to the inductor 3 whereby a pulsed magnetic field is estblished therein. Under the pressure of this field the welded section of the tube 1(1') is deformed changing the break-down voltage of the gap "a", the characteristics of the electrically conductive material filling the gap or an active resistance of the junction between the tubes 1' and 2. At an instant selected experimentally by weld tests the current switch gear 10 is energized and the activation bank of capacitors 7 discharges to the high-voltage winding 11 of the pulse matching transformer. The energy of this bank of capacitors is transmitted inductively to the tubes 1(1') and 2 connected to the low-voltage winding 12 of the pulse matching transformer and the welded tubes 1(1') and 2 are thereby heated or activated. As the welded section of the movable tube 1(1') moves further the welded surfaces of the tubes 1(1') and 2 are compressed or collide forming as a result a welded joint.

The pulse transformer must be capable of withstanding a voltage of several dozens of kilovolts between its windings, it must be sufficiently strong mechanically to withstand forces brought about by the $10^4$–$10^7$A currents flowing through their windings and feature a low leakage inductance. The latter is required to decrease energy losses in the transformer proper.

FIG. 7 shows diagrammatically a device for effecting a proposed method of welding in case of a high break-down voltage of the gap "a" between tubes 1 and 2. A distinctive feature of this device resides in coupling a series-connected inductor 3 with the enclosed welded section of a tube 1 and a bank of capacitors 5 to the tubes 1 and 2 by means of low inductance current leads 8 and 9. The bank of capacitors 5 is employed for both establishing a pulsed magnetic field in an inductor 3 and for activating the welded surfaces of the tubes 1 and 2.

Insofar as the welded surfaces of the tubes 1 and 2 are activated by the energy of an electric current flowing through the inductor 3, the above device is characterized by an exceptionally simple design, high dependability and effeciency. The welding cycle control is extremely simple because it does not call for any synchronizing means.

Prior to the welding cycle the tubes 1 and 2 must be placed ina proper manner and the gap therebetween must be filled with a low-pressure gas. The bank of capacitors 5 must be charged to the operating voltage.

The welding cycle is started by initiating an electric discharge between the tubes 1 and 2 by any known method, e.g., by means of a trigger spark. The current flowing in the circuit on the one hand establishes a pulsed magnetic field in the inductor 3 deforming the welded section of the tube 1 and on the other hand activates the welded surfaces of the tubes 1 and 2. The activation cycles and the subsequent collision of the welded surfaces are synchronized automatically because the entire process is controlled by the same gas discharge. The collision of the tubes resulting in their welding together will always occur with a delay with respect to the beginning of current flow in the circuit. To ensure most efficient operating conditions of the above device its parameters must be selected in accordance with the following expression including both experimental-found and calculated variables.

$$C_o = 1.2\, L_c b^2 \rho \delta V_c 2/(\mu_o U_o^2 \cdot an^2) \quad (2),$$

where
- $L_c$ — inductor inductance;
- $b$ — geometrical size characterizing current distribution in inductor-tube 1 system;
- $\rho$ — density of metal of movable tube 1;
- $\delta$ — wall thickness of movable tube 1;
- $V_c$ — speed of welded section of movable tube 1 which is needed to produce a welded joint by using the above welding procedure (is determined experimentally for particular metal pairs);
- $C_o$ — capacity of bank of capacitors 5;
- $U_o$ — operating voltage across bank of capacitors 5;
- $a$ — gap between tubes 1 and 2;
- $n$ — number of turns of inductor 3;
- $\mu_o$ — magnetic constant of vacuum.

It is worth noting that since the proposed welding procedure is of particular advantage for welding tubes 1 and 2 of relatively large size (over 20–30 mm in diameter) and owing to a comparatively low break-down voltage of the gap between the tubes 1 and 2 admissible in terms of technology (usually of about 4–5 kV/mm) in most cases single turn inductors must be used in practice. The above inductors feature a minimum inductance as compared with all other types of the known inductors. They are strong mechanically and technologically convenient for manufacture.

FIG. 8 depicts a schematic diagram of a device for realizing a proposed method of welding in case of a low break-down voltage of the gap "a" between the tubes 1 and 2 when this gap is filled with an electrically conductive material and when the tubes 1 and 2 are brought in contact with each other. A distinctive feature of this device is a current switch gear 4 connected intermediate of a low-inductance current lead 8 and the tap of an inductor 3 series-connected with a bank of capacitors 5. The current switch gear 4 can be also mounted between the inductor 3 and the bank of capacitors 5 or between the bank of capacitors 5 and a low-inductance current lead 9.

Before the beginning of the welding cycle the tubes 1 (1') and 2 are placed as required. If they are separated by a gap "a", the latter is filled with an electrically conductive material or a low-pressure gas. The bank of capacitors 5 is charged to the operating voltage.

Welding is initiated by cutting-in or closing the current switch gear 4 whereby a discharge current of the bank of capacitors 5 starts flowing through the inductor 3 and between the welded sections of the tubes 1(1') and 2.

When using the above device, two groups of welding conditions can be provided depending on the kind of medium contained between the tubes 1(1') and 2.

The first group of welding conditions takes place when the gap "a" between the tubes 1 and 2 is filled with the electrically conductive material or in case of a junction between the tubes 1 and 2 having a relatively high active resistance. In practice the welded surfaces of the tubes 1(1') and 2 are only heated, the heating not being continued to the activation stage. Simultaneously with the heating the surfaces are compressed, the compression being the result of deformation of the welded section of the tube 1(1') under the pressure of a pulsed magnetic field established in the inductor 3. So the first group of welding conditions is realized.

Welding conditions of the second group take place when the gap "a" between the tubes 1 and 2 is filled with the low-pressure gas. In this case the voltage applied to this gap after cutting-in or closing the current switch gear 4 and equal to a total operating voltage across the bank of capacitors 5 will break-down the gap.

An electric current flowing in the gap "a" after breaking it down activates the welded surfaces of the tubes 1 and 2. At the same time the welded section of the tube 1 passes a distance equals to the value of the gap "a" is accelerated to a speed of hundreds of meters per second. A collision between this section and that of the stationary tube 2 results in a welded joint.

The use of the current switch gear 4 allows increasing the operating voltage of the bank of capacitors 5. Hence, with a constant value of energy stored in this bank, its capacity can be decreased and the current frequency of the inductor 3 increased which is required when the tube 1 is produced from materials featuring a relatively low conductivity, such as, stainless steel. It also affords the possibility of preserving a sufficiently high frequency of electric current in the inductor 3 when the tubes 1 and 2 of large diameters are employed, i.e. when the inductance becomes great even if the inductor is of a single turn design.

Shown in FIG. 9 is a circuit of a device for effecting a proposed method of welding in case of a high break-down voltage of the gap "a" between the tubes 1 and 2. A specific feature of this device resides in an activation bank of capacitors 7 being coupled to low-inductance current leads 8 and 9 at the point of their contact with a series-connected inductor 3 and a bank of capacitors 5. The other contacts of the low inductance current leads 8 and 9 are connected to the tubes 1 and 2.

Before the welding cycle is initiated the tubes 1 and 2 must be placed properly, the gap "a" therebetween must be filled with low-pressure gas and the banks of capacitors 5 and 7 are charged to the operating voltage.

The welding cycle begins by initiating an electric discharge between the tubes 1 and 2 by any known method, such as, by using a trigger spark. Both banks of capacitors 5 and 7 are discharging in one electric discharge. The discharge current of the bank of capacitors 5 flowing through the inductor 3 sets up a pulsed magnetic field therein. Under the pressure of this field the welded section of the tubes 1 is deformed and acclerated passing a distance equal to the value of the gap "a" and attaining a speed of hundreds of meters per second at the instant of collision of the welded sections of the tubes 1 and 2.

As it follows from the circuit operating principle, the tubes are activated by two currents flowing in parallel in the electric discharge. As the inductance of the discharge circuit of the activation bank of capacitors 7 is considerably lower than that of the bank of capacitors 5, with considerble amounts of energy stored in these banks the current of the activation bank of capacitors 7 will have a much higher intensity. Thus, the degree of activation of the tubes 1 and 2 and their collision rate can be adjusted by selecting the capacities of the banks of capacitors 5 and 7, a feature enabling a substantial extension of the adjusting properties of the above device to be obtained by simple engineering means.

Illustrated in FIG. 10 is a schematic diagram of a device for effecting the proposed method of welding in case of a high break-down voltage of the gap "a" between tubes 1 and 2. A characteristic feature of this device resides in a current switch gear 4 series-connected with an inductor 3 and a bank of capacitors 5. This series-connected circit has contacts through which it is coupled wth low-inductance current leads 8 and 9 running to the tubes 1 and 2. Connected to these contacts is also an activation bank of capacitors 7.

Prior to the welding cycle, the tubes 1 and 2 must be positioned as rquired, the gap "a" between the tubes must be filled with a low-pressure gas and the banks of capacitors 5 and 7 must be charged to the operating voltage. In this case the operating voltage of the bank of capacitors 5 can exceed considerably that of the activation bank of capacitors 7.

The welding cycle is started by initiating an electric discharge between the tubes 1 and 2 by some known procedure, e.g., by using a trigger spark. As a result the activation bank of capacitors 7 will discharge through the electric discharge in the gap "a" between the tubes 1 and 2 activating the welded surfaces of the tubes 1 and 2. After an optimum time period selected experimentally in each particular case the current switch gear 4 is cut-in or closed and the bank of capacitors 5 begins discharging through the inductor 3 and the electric discharge in the gap "a" between the tubes 1 and 2 A resulting pulsed magnetic field deforms the welded section of the tube 1 by its pressure and accelerates it on a path equal to the value of the gap "a" to a speed of about hundreds of meters per second. When the welded sections of the tubes 1 and 2 collide, a welded joint is produced.

The use of the current switch gear 4 allows increasing the operating voltage across the bank of capacitors 5. Hence, with constant amounts of energy stored in this bank its capacity can be decreased. Thus it is possible to increase the current frequency in the inductor 3, this being necessary when the tube 1 is manufactured from materials featuring a relatively low conductivity, such as, stainless steel. It is also possible to maintain a current of a sufficiently high frequency in the inductor 3 when the tubes 1 and 2 have large diameters, i.e. when the inductance of even a single turn inductor becomes great.

When the possibiity of adjusting the welding conditions by means of a voltage across the activation bank of capacitors 7 is already limited by the break-down voltage of the gap "a" between the tubes 1 and 2, the degree of activation of the tubes is adjusted by selecting a corresponding capacity of the activation bank of capacitors 7 and an instant for cutting-in the current switch gear 4.

The polarity of a charging voltage across the bank of capacitors 5 and 7 must be selected so that at an optimum moment their discharge currents will flow through an electric discharge in one direction enhancing thereby the degree of activation of the tubes 1 and 2.

By using the above-described device the degree of activation of the tubes as well as the rate of collision of their welded surfaces can be to a considerable extent adjusted independently. It also offers a sufficiently efficient solution of the problem of welding tubes of large diameters.

Presented in FIG. 11 is a schematic diagram of a device for realizing a proposed method of welding in case of a high break-down voltage of the gap "a" between tubes 1 and 2. A distinctive feature of this device consists in that a current switch gear 10 is series-connected with an activation bank of capacitors 7. This series-connected circuit as contacts to which are coupled low-inductance current leads 8 and 9 running to the tubes 1 and 2. A series-conneced circuit comprising an inductor 3 and a bank of capacitors 5 is also connected to these contacts.

Before the welding cycle is initiated the tubes 1 and 2 are placed as required, the gap "a" therebetween is filled with a low-pressure gas and the banks of capacitors 5 and 7 are charged to the operating voltage. The operating voltage of the activation bank of capacitors 7 can be much higher than that of the bank of capacitors 5.

The welding cycle commences by initiating an electric discharge between the tubes 1 and 2 by using some known procedure, such as, a trigger spark. As a result the bank of capacitors 5 discharges through the inductor 3 and an electric discharge in the gap "a" between the tubes 1 and 2, activating the welded surfaces and causing deformation of the welded section of the tube 1 under the pressure of a pulsed magnetic field established in the inductor 3. After an optimum period of time selected in each particular case experimentally by weld tests the current switch gear 10 is cut-in or closed and the activation bank of capacitors 7 starts discharging through the electric discharge in the gap "a" between the tubes 1 and 2. As a result the welded surfaces of the tubes 1 and 2 are exposed to an additional powerful activation pulse. As the welded section of the movable tube 1 moves further, it collides with the welded section of the tube 2 and a welded joint is obtained.

The use of the current switch gear 10 allows increasing the operating voltage of the activation bank of capacitors 7. Hence, with constant amounts of energy stored in this bank its capacity can be reduced, increasing both the frequency and the amplitude of the discharge current of the activation bank of capacitors 7. A powerful short-duration additional activation pulse is advisable to be applied to the tubes 1 and 2 directly at the instant of collision of their welded sections as the eroding effect of an electric discharge on the electrode (in this case on the tubes 1 and 2) surface increases with a decrease of the gap therebetween.

The polarity of a charging voltage across the banks of capacitors 5 and 7 must be chosen so that their discharge currents will flow through an electric discharge at an optimum instant and in one direction enhancing thereby the degree of activation of the tubes 1 and 2.

By using the above-described device the activation degree of the tubes and the rate of collision of their welded sections can be adjusted to a great extent independently.

FIG. 12 shows a schematic diagram of a device for realizing a proposed method of welding at a low breakdown voltage of the gap "a" between tubes 1 and 2, when the gap is filled with an electrically conductive material and when the tubes 1 and 2 contact each other.

A distinctive feature of this device is the connection of a current switch gear 4 in series to an inductor 3 and a bank of capacitors 5 as well as the series-connection of a current switch gear 10 with an activation bank of capacitors 7. The two series-connected electrc circuits are coupled wth each other in parallel at the point of contact with low-inductance current leads 8 and 9 running to the tubes 1(1') and 2 being welded.

Before the welding cycle is initiated the tubes 1(1') and 2 are placed as required. The gap "a" between the tubes 1 and 2 is filled with an electrically conductive material or a low-pressure gas. The banks of capacitors 5 and 7 are charged to the operating voltages.

All welding conditions which can be provided by the above device can be subdivided into two groups: the first one, when the current switch gear 10 is first cut in or closed in the circuit of the activation bank of capacitors 7 and the second, when first the current switch gear 4 is first cut in or closed in the circuit of the bank of capacitors 5 establishing a pulsed magnetic field in an inductor 3 and heating (activating) concurrently the tubes 1(1') and 2. Between these extreme groups of welding conditions there is an intermediate case when the current switch gears 4 and 10 are cut in or closed at the same time.

Welding under the first group of welding conditions is started by cutting in the current switch gear 10 which results in the activation bank of capacitors 7 discharging between the tubes 1(1') and 2 and heating or activating their welded surfaces. After an optimum period of time chosen experimentally the current switch gear 4 is cut-in and the bank of capacitors 5 commences to discharge through the inductor 3 and the medium contained between the tubes 1(1') and 2. Under the effect of the pressure of the pulsed magnetic field set up in the inductor 3 the welded section of the tube 1(1') is deformed until the heated (activated) welded surfaces of the tubes 1(1') and 2 are compressed directly or through an interlayer of the electrically conductive material. In case the gap "a" between the tubes 1 and 2 is filled with the low-pressure gas, the activated surfaces of the tubes 1 and 2 collide, the compression or collision of the tubes 1(1') and 2 leading to their welding.

As for the welding conditions of the second group, in this case the welding cycle starts by cutting in or closing the current switch gear 4 and the ensuing discharge of the bank of capacitors 5 through the inductor 3 and the medium between the tubes 1(1') and 2. Under the pressure of the pulsed magnetic field established in the inductor 3 the welded section of the tube 1(1') is deformed changing the characteristics of the electrically conductive material in the gap "a" or the value of a transient active resistance between the tubes 1 and 2. This is accompanied by the simultaneous heating or activating of the welding zone. At an optimum instant selected by weld tests the currrent switch gear 10 is cut in or closed and the activation bank of capacitors 7 starts discharging through the medium between the tubes 1(1') and 2 assisting in the heating or activating of the welding zone. As the welded section of the tube 1(1') moves further, the welded surfaces of the tubes 1(1') and 2 are compressed or collide and a weld is produced.

However, the concurrent cutting-in of the current swich gears 4 and 10 can be only formally considered as a separate case since the deformed section of the tube 1(1') must be shifted to a certain distance to provide the compression or collision effect on the welded surfaces. Therefore the heating or activation of the tubes 1(') and 2 will always occur somewhat earlier.

The above device provides ample possibility of adjusting welding conditions using the energy of both banks of capacitors for activation purposes. In designing the device it is possible to extend considerably the range of employed standard equipment, especially of pulsed-discharge capacitors. The device ensures the welding of tubes 1(1') and 2 of large diameters.

Figure 13:
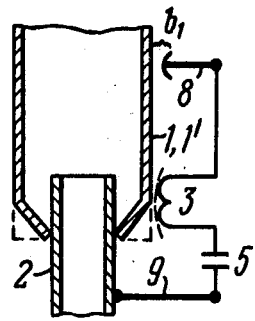
FIG. 13 shows a device for effecting the proposed method of welding according to the invention, in case a gap is provided between one of the tubes and its low-inductance current lead connecting it to an electric circuit, comprising an inductor and a bank of capacitors connected in series.

Presented in FIG. 13 is a schematic diagram of a device for realizing a proposed method of welding at a low break-down over voltage of the gap "a" between tubes 1 and 2 in two cases: when the gap is filled with an electrically conductive material and when the tubes 1' and 2 contact each other. A specific feature of this device is a gap $b_1$ between a low inductance current lead 8 and the movable tube 1(1') filled with a low-pressure gas. From the opposite side this current lead 8 is coupled with a series-connected electric circuit comprising an inductor 3, a bank of capacitors 5 and a low-inductance current lead 9 which in turn is in contact with the stationary tube 2. The stationary tube 2 and the low-inductance current lead 9 can be also separated by a gap. In that case the tube 1(1') must be in contact with the low-inductance current lead 8. If the gap "a" between the tubes is filled with an electrically conductive material, the break-down voltage of the gap "$b_1$" must be higher than the operating voltage across the bank of capacitors 5. If the gap "a" between the tubes 1 and 2 is filled with a low pressure gas, the total break-down voltage of the gaps "a" and "$b_1$" should be higher than the operating voltage of this bank.

Before the welding cycle is initiated the tubes 1(1') and 2 are properly mounted. The gap "a" between the tubes 1 and 2 is filled with the electrically conductive material or with the low-pressure gas. The gap "$b_1$" between the tube 1(1') and the low-inductance current lead 8 is filled with the low-pressure gas. The bank of capacitors 5 is charged to the requisite voltage.

The welding cycle commences by initiating an electric discharge in the gap "$b_1$" between the tube 1 and the low-inductance current lead 8. As a result a discharge current of the bank of capacitors 5 will flow through the inductor 3 and between the welded sections of the tubes 1(1') and 2.

Two typical groups of welding conditions are possible when using the above device, the conditions being dependent on the kind of medium filling the gap between the tubes 1(1') and 2.

The first group of welding conditions takes place when the gap "a" between the tubes 1 and 2 is filled with an electrically conductive material or when the junction features a comparatively high active resistance between the tubes 1' and 2. Practically in these cases the welded surfaces of the tubes 1(1') and 2 are always only heated, the heating not reaching an activation stage. Concurrently with the heating of the welded surfaces they are compressed due to deformation of the welded section of the tube 1(1') under the effect of a pressure of a pulsed magnetic field set up in the inductor 3. Thus, the tubes 1(1') and 2 are welded by using the first group of welding conditions.

Welding conditions of the second group take place when the gap "a" between the tubes 1 and 2 is filled with a low-pressure gas. In this case the voltage applied to the gap "a" after breaking-down the gap "$b_1$" is equal to the total operating voltage across the bank of capacitors 5 and will break-down the gap. The electric current flowing after breaking-down the gap "a" activates the welded surfaces of the tubes 1 and 2. At the same time the welded section of the tube 1 is accelerated to a speed of hundreds of meters per second on the path equal to the value of the gap "a" between the tubes 1 and 2. As this section collides with the welded section of the stationary tube 2 a welded joint is produced.

Owing to the presence of the gap "$b_1$" between the tube 1(1') and the low-inductance current lead 8 a higher operating voltage across the bank of capacitors 5 can be used. Hence, with a constant amount of energy stored in this bank its capacity can be decreased and the current frequency in the conductor increased, this being required when the tube 1(1') is manufactured from materials featuring a relatively low conductivity, such as, stainless steel. It also ensures a sufficiently high frequency of the current in the inductor while welding tubes 1 and 2 of large diameters, i.e. when even the inductance of a singleturn inductor becomes great.

The gap "$b_1$", between the tube 1(1') and the low-inductance current lead 8 makes it possible to simplify considerably the contact appliances that are necessary for supplying current to the tubes 1(1') and 2 when they are disposed vertically. In this case a liquid-metal contact can be provided between the low-inductance current lead 9 and the stationary tube 2. The above-described device is suitable for welding the tubes 1(1') and 2 if the production process permits the appearance of traces of metal erosion on the external surface of the tube 1(1') in the electric discharge zone. In most cases this requirement is fulfilled.

Shown in FIG. 14 is a schematic diagram of a device for effecting a proposed method of welding at a low break-down voltage of the gap "a" between the tubes 1 and 2, when the gap is filled with an electrically conductive material and in case the tubes 1' and 2 contact each other. A distinctive feature of this device consists in the use of gaps "$b_1$" and "$b_2$" between the low-inductance current leads 8 and 9 and corresponding tubes 1(1') and 2. Both gaps are filled with a low pressure gas. On the opposite side the low-inductance current leads 8 and 9 are series-connected with an inductor 3 and a bank of capacitors 5. If the tubes 1(1') and 2 are separated by an electrically conductive medium the total break-down voltage of the gaps "$b_1$" and "$b_2$" must be higher than the operating voltage across the bank of capacitors 5. If the gap "a" between the tubes 1 and 2 is filled with a low-pressure gas, the total break-down voltage of the gaps "a", "$b_1$" and "$b_2$" must be higher than the operating voltage across this bank of capacitors.

Before the welding cycle is started the tubes 1(1') and 2 must be mounted in a proper manner. The gap "a" between the tubes 1 and 2 must be filled with an electrically conductive material or a low-pressure gas. The gaps "$b_1$" and "$b_2$" between the tubes 1(1') and 2 and corresponding low-inductance current leads 8 and 9 should be filled with the low-pressure gas. The bank of capacitors 5 must be charged to a requisite voltage.

The welding cycle is started by initiating electric discharges in the gaps "$b_1$" and "$b_2$" by using any known procedure or means, such as, a trigger spark. As a result a discharge electric current of the bank of capacitors 5 will flow through the inductor 3 and between the welded sections of the tubes 1(1') and 2.

In other respects the welding process proceeds similarly to that which occurs in the device illustrated in FIG. 13.

Owing to the presence of the gaps "$b_1$" and "$b_2$" the tubes 1(1') and 2 and corresponding low-inductance current leads 8 and 9 the operating voltage across the bank of capacitors 5 can be increased. Hence, with a constant amount of energy stored in this bank its capacity can be decreased and the frequency of the current flowing through the inductor increased, this being required when the tube 1(1') is manufactured from materials featuring a relatively low conductivity, such as, stainless steel. It also allows maintaining a sufficiently high electric current frequency in the inductor for large-diameter tubes 1(1') and 2, i.e. when the inductance of even a single turn inductor becomes great.

The use of the gaps "$b_1$" and "$b_2$" makes it possible to obviate contact appliances for supplying electric current to the tubes. Thus, the above-described device features a maximum simplicity of construction.

It is worth noting that the gaps "$b_1$" and "$b_2$" between the tubes 1(1') and 2 and corresponding current leads can be employed in any one of the above outlined arrangements of the devices for realizing the proposed method of welding. They are inexpedient only in the device illustrated in FIG. 6, wherein they would cause heavy active losses of energy.

FIG. 15 shows a schematic diagram of a device for effecting the proposed method of welding when the gap between tubes 1 and 2 features a high electrical strength. A distinctive feature of this device resides in disconnectors 13, $13^1$ and 14, $14^1$ being inserted between the terminals of a bank of capacitors 5 at one side and the inductor terminal and a low-inductance current lead 9 coupled to a tube 2 at the other side. The inductor 3 is connected to a low-inductance current lead 8, the other end of the current lead being coupled to the tube 1.

Another specific feature of the device is the arrangement of an inductor 3, welded tubes 1 and 2 and low-inductance current leads 8 and 9 in a separate detachable welding unit. The device could comprise several such units disposed on a distributing gear 15 ensuring series-connection of the welding units to the bank of capacitors 5. The contacts of the disconnectors 13 and 14 are arranged on the terminals of the bank of capacitors 5, and corresponding contacts $13^1$ and $14^1$ of the disconnector are provided on each welding unit. Disconnectors of any design are adaptable but most promising are those with liquid-metal contacts.

The above device functions in the following manner (its operation is considered from the instant of completion of a preceding welding cycle). The distributing gear 15 detaches the welding unit from the bank of capacitors 5 whereupon the unit is carried into an unloading-loading zone where a finished article is withdrawn therefrom and tubes 1 and 2 are loaded therein. Then the welding zone is sealed hermetically and upon being evacuated it is filled with a requisite gas. The above operations last until welding is completed in all the subsequent welding units that have been prepared for operation in a similar way. Within that period the welding unit under consideration is transferred to a bank of capacitors 5 and is connected to it by means of disconnectors 13,13$^1$ and 14,14$^1$. The disconnection-connection operations as well as the transfer of the welding units are carried out by the distributing gear 15, e.g., of a rotary type. The unit transfer time is employed for discharging the bank of capacitors 5. As soon as the welding unit is connected to an energy storing unit, a gas discharge is initiated between the tubes 1 and 2. In all other respects the welding procedure is similar to that in the device illustrated in FIG. 7.

By using the above device it is possible to conduct welding at a frequency limited only by the discharge time of the bank of capacitors 5. If the discharge time of the bank of capacitors 5 amounts to $\tau_1$, the time for mounting operations amounts to $\tau_2$ and evacuation and gas-filling time to amount $\tau_3$, then the minimum number of the requisite welding units is defined by the relation $n = (\tau_2+\tau_3)/\tau_1$ and the efficiency of the device will be $(\tau_1+\tau_2+\tau_3)/\tau_1$ times more than that of the device shown in FIG. 7.

Pulse-magnetic electric welding is capable of coping with a wide range of engineering problems due to a sufficiently wide range of developed devices. From the point of view of technology particular preference cannot be given to any of them. Therefore it is better to consider in detail the device illustrated in FIG. 7 and featuring a maximum design simplicity and minimum energy losses. By using the devices of this type it is possible to weld tubular copper-steel and steel-steel adapters about 130 mm in diameter with wall thicknesses of a movable tube of about 2.5 mm. Particulars will be given here for the operation of a device intended for welding of copper-steel tubular adapter having a diameter of 40–50 mm, the wall thickness of the movable (copper) tube being 1–1.5 mm. This device has a low inductance energy storing member with a storage capacity of $2.24 \cdot 10^{-3}$ F and a maximum operating voltage of $5.10^3$ V. A single turn inductor is employed connected to the other elements of the device by low-inductance current leads. The gap between the tubes can be varied within 0.5–3.5 mm. Nonuniformity of the gap within 20% has no effect on the quality of the weld. The space between the tubes is hermetically sealed and evacuated to a residual pressure of $10^{-1}$–$10^{-4}$ mm Hg. Under typical welding conditions the voltage across the storage member amounts to $3.10^3$ V and the magnetic field intensity in the gap between the inductor and the movable tube does not exceed $230.10^3$ Oe. The weld is uniform along the circumference of the tube. It axial length varies from 3 to 10 mm dependng on the voltage of the storage member and the parameters of collision of the tubes. Maximum efficiency of welding is calculated from Formula (1) is ~1.25 g/kJ. Shearing strength tests of the welds showed them to be stronger than the strength of the weakest metal (copper). Total shearing force of the weld on specimens 44 mm in diameter is 12–14 t. The structure of the weld resulting from the present method for welding is noted for its high specificity so that it can be distinguished from all the so far known methods of welding. The polished specimen of the welded joint produced by the procedures according to the invention exhibits characteristics in the region of junction between the tubes that are inherent to the explosion and fusion welding processes. Quantitatively the manifestation of these characteristics may vary but their concurrent presence in every weld is a must.

The following pairs of metals have already proved weldable by the present method according to the invention: steel-steel, steel-aluminium, steel-aluminium alloys steel-titanium and alloys thereof, steel-copper and alloys thereof, cast-iron - copper and alloys thereof, copper-aluminium and alloys thereof, titanium and alloys thereof, aluminium and alloys thereof, etc.

What we claim is:

1. A method for lap welding of electrically conductive tubes of which one is a movable tube having a tubular section to be welded and the other is a stationary tube with a section to be welded coaxial with said section of the movable tube, said method comprising the steps of preheating said tubes by passing an electrical current radially between the surfaces of the sections to be welded of the tubes which face each other simultaneously along the entire circumference of the cross-section of said sections to be welded; and compressing said sections to be welded by deforming said section of the movable tube to be welded under the pressure of a pulsed magnetic field.

2. A method of claim 1, wherein an electric current is passed between the tubes as a pulse current.

3. A method of claim 2, wherein the pulse current is passed between the tubes at the instant of compression of their welded surfaces.

4. A method of claim 1, wherein an electric current is passed between the tubes as a train of pulse currents.

5. A method of claim 1, wherein the tubes are disposed with a gap that is filled with an electrically conductive material.

6. A method of claim 1, wherein the welded section of the movable tube is shaped as a truncated cone whose end contacts the stationary tube.

7. A method of claim 1, wherein the tubes are disposed with a gap that is filled with a low-pressure gas.

8. A method of claim 1, wherein the tubes are produced in similar metals from the group consisting of steel-steel, copper-copper, aluminum-aluminum.

9. A method of claim 1, wherein the tubes are manufactured in dissimilar metals from the group consisting of copper-steel, steel-aluminum and alloys thereof, steel-titanium and alloys thereof, copper-titanium and alloys thereof.

* * * * *